US008478223B2

(12) United States Patent
Hiers et al.

(10) Patent No.: US 8,478,223 B2

(45) Date of Patent: Jul. 2, 2013

(54) METHODS AND APPARATUS FOR RECEIVING RADIO FREQUENCY SIGNALS

(75) Inventors: John D. Hiers, Connersville, IN (US); Marwan E. Nusair, Cincinnati, OH (US)

(73) Assignee: Valentine Research, Inc., Cincinnati, OH (US)

( * ) Notice: Subject to any disclaimer, the term of this patent is extended or adjusted under 35 U.S.C. 154(b) by 258 days.

(21) Appl. No.: 12/983,383

(22) Filed: Jan. 3, 2011

(65) Prior Publication Data

US 2012/0171981 A1 Jul. 5, 2012

(51) Int. Cl.

*H04B 1/18* (2006.01)

*H04K 3/00* (2006.01)

(52) U.S. Cl.

USPC ............................ 455/280; 333/124; 343/772

(58) Field of Classification Search

USPC .................... 455/280–282; 333/21 R, 32, 33, 333/124–126, 129; 343/772

See application file for complete search history.

(56) References Cited

U.S. PATENT DOCUMENTS

| | | | |
|---|---|---|---|
| 2,825,060 A | 2/1958 | Ruze | |
| 2,825,876 A | 3/1958 | Le Vine et al. | |
| 3,173,146 A | 3/1965 | Carson | |
| 3,188,583 A | 6/1965 | Boyd | |
| 3,566,309 A | 2/1971 | Ajioka | |
| 3,969,691 A | 7/1976 | Saul | |
| 4,021,814 A | 5/1977 | Kerr et al. | |
| 4,144,506 A | 3/1979 | McCammon et al. | |
| 4,201,956 A | 5/1980 | Kienberger et al. | |
| 4,210,915 A | 7/1980 | Kienberger et al. | |
| 4,453,142 A | 6/1984 | Murphy | |
| 4,458,222 A | 7/1984 | Herstein et al. | |
| 4,531,131 A | 7/1985 | Monser | |
| 4,550,296 A | 10/1985 | Ehrlinger et al. | |
| 4,562,416 A | 12/1985 | Sedivec | |
| 4,571,593 A | 2/1986 | Martinson | |
| 4,630,062 A | 12/1986 | Dewey | |
| 4,658,267 A | 4/1987 | Roy et al. | |
| 4,672,384 A | 6/1987 | Roy et al. | |
| 4,673,897 A | 6/1987 | Chua et al. | |
| 4,673,946 A | 6/1987 | Hoover | |
| 4,679,249 A | 7/1987 | Tanaka et al. | |
| 4,716,386 A | 12/1987 | Lait | |
| 4,878,061 A | 10/1989 | Nusair et al. | |
| 4,973,925 A | 11/1990 | Nusair et al. | |
| 5,450,090 A | 9/1995 | Gels et al. | |
| 5,877,123 A * | 3/1999 | Das | 505/210 |
| 2006/0186969 A1* | 8/2006 | Rauscher | 333/135 |

OTHER PUBLICATIONS

Izadian, Jamal; Unified Design Plans Aid Waveguide Transitions; Microwaves & RF; May 1987.

(Continued)

*Primary Examiner* — Lee Nguyen

(74) *Attorney, Agent, or Firm* — Stevens & Showalter LLP

(57) ABSTRACT

Radio frequency signals having a plurality of frequency ranges are received and coupled to a plurality of transmission lines, each of the plurality of transmission lines being formed in a corresponding plurality of generally parallel planes. Circuitry is formed for each of the plurality of transmission lines to define substantially low impedances for all of the plurality of frequency ranges except for a frequency range or ranges to be carried by the corresponding transmission line. Signals are coupled to the plurality of transmission lines so that signals with the plurality of frequency ranges are received and distributed with substantially decreased reflection and substantially high impedance matching by the plurality of transmission lines.

25 Claims, 4 Drawing Sheets

OTHER PUBLICATIONS

Montgomery, James P.; On the Complete Eigenvalue Solution of Ridged Waveguide; IEEE Transactions on Microwave Theory and Techniques; vol. MTT-19, No. 6; pp. 547-555; Jun. 1971.
Pyle, J.R.; The Cutoff Wavelength of the TE Mode in Ridged Rectangular Waveguide of Any Aspect Ratio; IEEE Transactions on Microwave Theory and Techniques; vol. MTT-14, No. 4; pp. 175-183; Apr. 1966.
Walton, K. L.; Broadband Ridged Horn Design; The Microwave Journal; pp. 96-101; Mar. 1964.

* cited by examiner

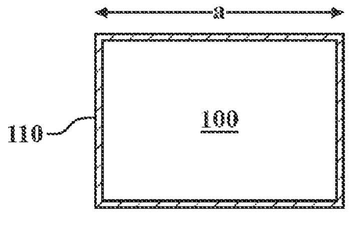
FIG. 1A
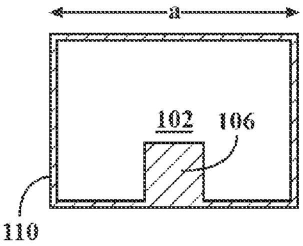
FIG. 1B
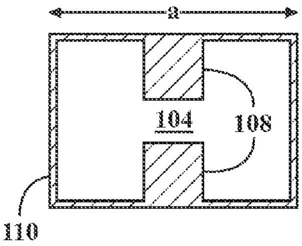
FIG. 1C
FIG. 2
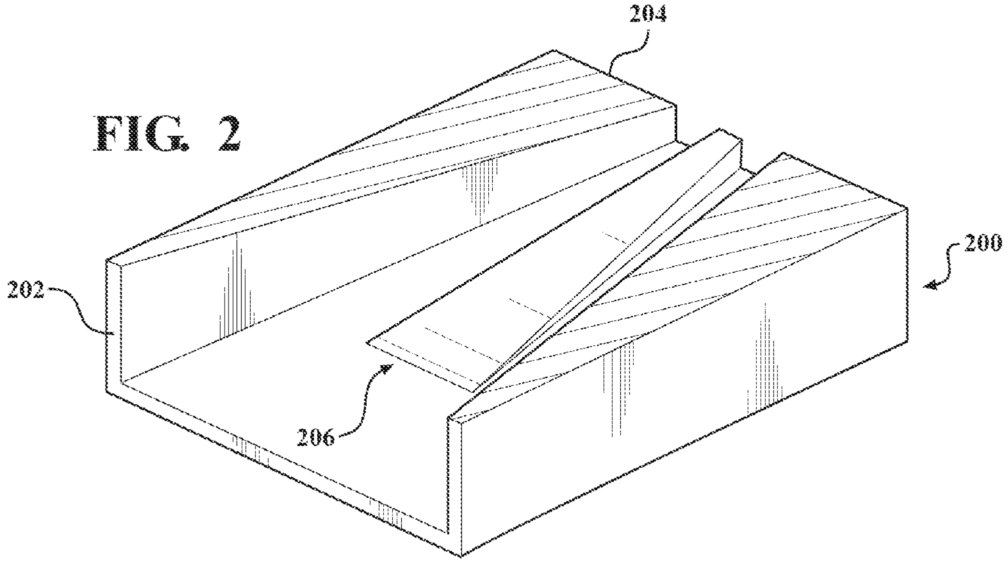
FIG. 3
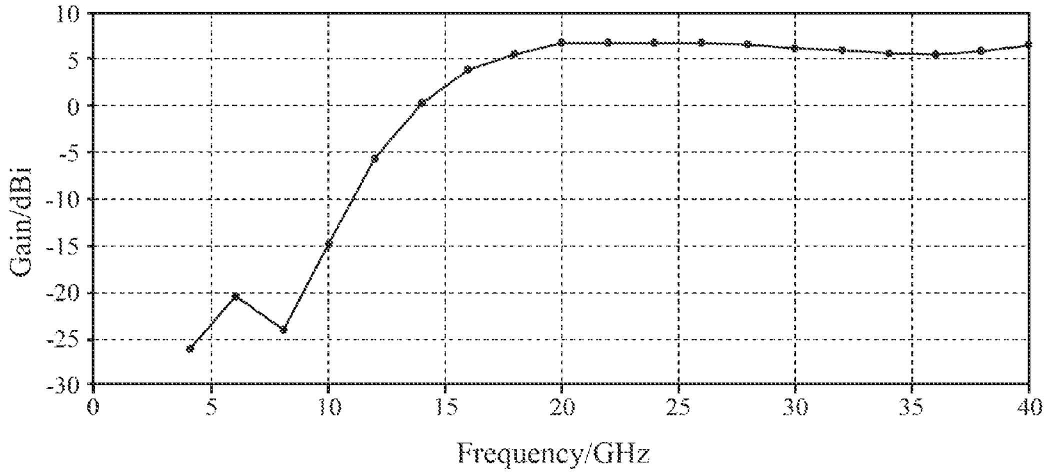

FIG. 4
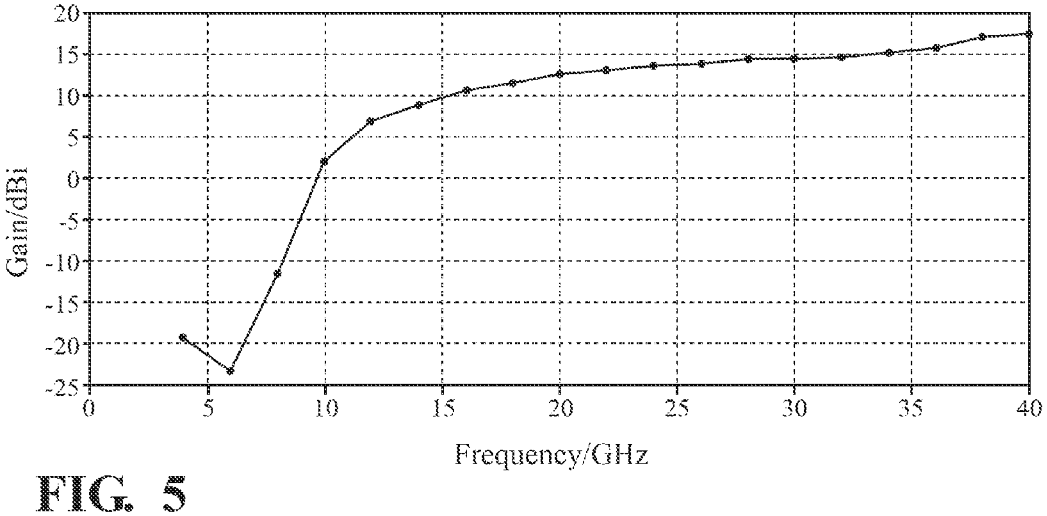
FIG. 5
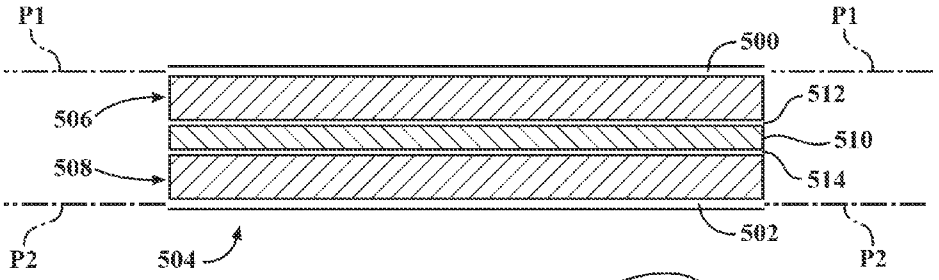
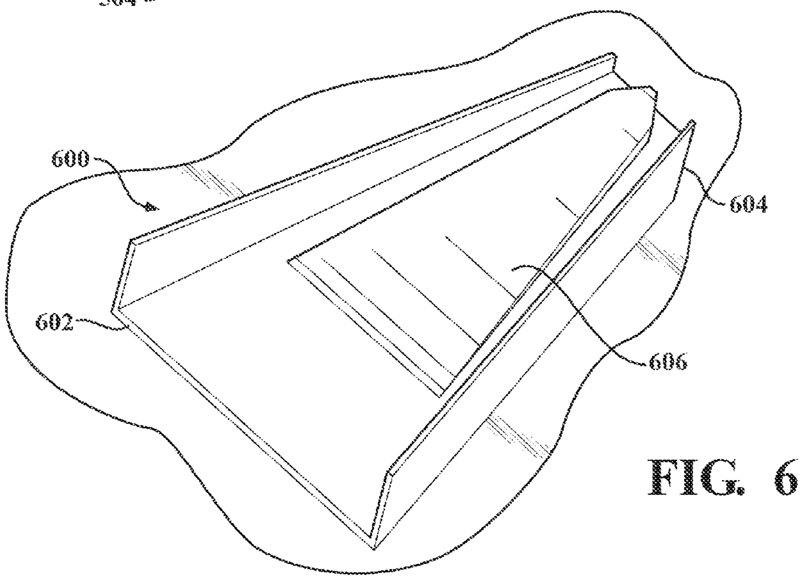
FIG. 6

METHODS AND APPARATUS FOR RECEIVING RADIO FREQUENCY SIGNALS

CROSS REFERENCE TO RELATED APPLICATIONS

The present application is related to a U.S. patent application Ser. No. 12/983,351 entitled MIRCROWAVE FILTER that is being filed on the same day as the present application, is assigned to the assignee of the present application and is incorporated by reference herein in its entirety. The present application is related to a U.S. patent application Ser. No. 12/983,361 entitled COMPACT BANDPASS FILTER WITH NO THIRD ORDER RESPONSE that is being filed on the same day as the present application, is assigned to the assignee of the present application and is incorporated by reference herein in its entirety.

FIELD OF THE INVENTION

The present invention relates in general to the field of radio frequency (RF) communications. More particularly, the present invention relates to receiving RF signals in the microwave region of the RF frequency spectrum and efficiently conveying received RF signals in a first frequency range through one of two transmission lines and conveying received RF signals in a second frequency range through the other of the two transmission lines.

BACKGROUND OF THE INVENTION

Horn antennas have been used to receive RF signals for decades and many different types of horn antennas have been designed and used. A simple horn antenna has a rectangular cross-section which tapers in cross-section from the front of the antenna to the back of the antenna, causing the dominant mode of the received electromagnetic energy to smoothly transition from incoming plane-wave-like energy for receipt. The electromagnetic energy travels from the front of the antenna to the back of the antenna without any discontinuity or reflection so that the dominant mode of the electromagnetic energy is transformed to substantially match a waveguide, a microstrip, a stripline or some other convenient form of transmission line that carries the RF signals to a receiver.

A major disadvantage of simple horn antennas is that when they are used at frequencies whose wavelengths are less than either the major or minor dimensions of the cross-sections of the antennas, higher order modes become possible. This is true whether an antenna has a rectangular cross-section, an elliptical cross-section or some other operable cross-section. The higher order modes have pattern maxima that are at an angle to the centerline of the antenna. As a result of the higher modes, the antenna gain, which is a measure of the energy proceeding along the centerline as a fraction of the total energy, is reduced.

To prevent the higher order modes, know as "over-moding," simple horn antennas are restricted to reception of frequency ranges of less than one octave. To overcome the restricted frequency range, ridged waveguide horn antennas have been developed. FIGS. 1A, 1B and 1C show cross-sections of a simple rectangular waveguide 100, a single-ridge waveguide 102, and a double-ridge waveguide 104, respectively.

The addition of one ridge 106 or two ridges 108 changes the relationship between the frequencies of the modes. In the rectangular waveguide 100 or antenna of FIG. 1A, the fundamental mode must have a frequency $f_c$ of at least:

$$f_c = \frac{c}{2a} \qquad \text{Equation 1}$$

where a=the long side length and c=the speed of light in the medium, and the mode in question is vertically polarized (the small side 110 being defined as the vertical side in FIG. 1A). Higher order modes are possible when the frequency is more than twice this minimum frequency $f_c$. The impedance of the antenna gradually increases as the frequency of operation is reduced to $f_c$ until it approaches infinity at $f_c$, so that the practical frequency range is more likely to be about $1.3f_c$ to just under $2f_c$.

The value of $f_c$ determines the minimum size to which the horn may taper at the back of a simple horn antenna. This size is given by the inverse of Equation 1 above and is shown in Equation 2:

$$a_{min} > \frac{c}{2f_c} \qquad \text{Equation 2}$$

For practical purposes, the minimum size is usually taken to be about 30% greater than that given by Equation 2 in order to keep the impedance from becoming too high to match to the following circuit. In order to increase the range of operational frequencies of a horn antenna, one or two ridges can be formed in the horn antenna as shown in the cross-sectional views shown in FIGS. 1B and 1C, respectively. When ridges are used, the relationship between the higher mode frequencies and the fundamental mode frequency is no longer a simple multiple. With a suitable choice of ridge width and gap (measured from the top of the ridge 106 to the antenna "ceiling" 112 in FIG. 1B, or between the two ridges 108 in the FIG. 1C), a frequency range of more than one octave can be achieved without over-moding, and some ridged waveguides can pass frequency ranges of $3f_c$, $4f_c$ or even greater.

The challenge of transferring electromagnetic energy from the waveguide or antenna to another medium must be addressed when using ridged horn antennas. More particularly, with the advent of solid state devices that are usually implemented on microstrip printed circuit boards and stripline printed circuit boards, a method of effectively transferring received RF signals from ridged horn antennas to an associated printed circuit board is needed. Novel methods and apparatus for these transfers is the subject of the present application.

SUMMARY OF THE INVENTION

In accordance with the broadest aspects of the present application, radio frequency signals having a plurality of frequency ranges are received and coupled to a plurality of transmission lines, each of the plurality of transmission lines being formed in one of a corresponding plurality of generally parallel planes. Circuitry is formed for each of the plurality of transmission lines to define substantially low impedances for all of the plurality of frequency ranges except for a frequency range to be carried by the corresponding transmission line. Signals are coupled to the plurality of transmission lines so that signals with the plurality of frequency ranges are received and distributed with substantially decreased reflection and substantially high impedance matching by the plurality of transmission lines.

In accordance with one aspect of the application, a radio frequency signal receiving structure comprises a waveguide component for receiving signals having at least a first frequency range and a second frequency range. A first transmission line for carrying signals within the second frequency range is formed in a first plane and a second transmission line for carrying signals within the first frequency range is formed in a second plane parallel to the first plane. A signal splitting component comprises first circuitry associated with the first transmission line in the first plane for producing a substantially low impedance at the first frequency range, and second circuitry associated with the second transmission line in the second plane for producing a substantially low impedance at the second frequency range. A transition component transfers the signals from the waveguide component to the first and second transmission lines. The signal receiving structure is configured to transfer signals within the first frequency range through the second transmission line with substantially low loss and substantially high impedance matching, and to transfer signals within the second frequency range through the first transmission line with substantially low loss and substantially high impedance matching.

The first circuitry may comprise at least one stub connected to the first transmission line with the at least one stub configured to attenuate signals within the first frequency range and pass signals within the second frequency range. The at least one stub may have an embedded spurline. The first circuitry may comprise at least two stubs connected to the first transmission line.

The second circuitry may comprise at least one spurline formed in the second transmission line with the at least one spurline configured to substantially attenuate signals at the second frequency range while substantially passing signals at the first frequency range. The second circuitry may also comprise a plurality of spurlines formed in the second transmission line with the plurality of spurlines configured to substantially attenuate signals at the second frequency range while substantially passing signals at the first frequency range. The first frequency range may comprise 10.5 GHz to 10.55 GHz and 13.35 GHz to 13.55 GHz; and the second frequency range may comprise 22 GHz to 24 GHz and 32 GHz to 36 GHz.

The waveguide component may define a cavity extending from a first opening to a second opening with the first opening being larger than the second opening. The cavity may be configured to have a rectangular, elliptical, curvilinear or other operable cross-section. The waveguide component may comprise a first ridge disposed inside the cavity and a second ridge disposed inside the cavity opposite to the first ridge. The first and second ridges may be independently configured to have substantially the same cross-sections towards the first opening of the cavity. The first and second ridges can be configured to have rectangular cross-sections.

The transition component may comprise a portion of the first ridge that is coupled to the first transmission line and a portion of the second ridge that is coupled to the second transmission line.

The signal receiving structure may further comprise at least one ground plane associated with the first and second transmission lines. The at least one ground plane may comprise a first ground plane associated with the first transmission line and a second ground plane associated with the second transmission line, wherein the first ground plane is separated from the second ground plane by dielectric material. The first and second ground planes may be connected to one another through the dielectric material and the dielectric material may extend into the waveguide component. The dielectric material may comprise two or more layers of dielectric material secured to one another with adhesive.

The radio frequency signal receiving structure may further comprise third circuitry located between the first and second planes. The third circuitry is separated from the first and second planes by at least one dielectric layer. The waveguide component may comprise a double-ridge horn antenna.

In accordance with another aspect of the present invention, a method for receiving radio frequency signals may comprise: receiving signals having at least a first frequency range and a second frequency range using a waveguide component; producing a substantially low impedance at the first frequency range in a first transmission line in a first plane; producing a substantially low impedance at the second frequency range in a second transmission line in a second plane, the first and second planes being substantially parallel to one another; and transferring signals in the first frequency range from the waveguide component to the second circuitry with substantially low loss and substantially high impedance matching; and transferring signals in the second frequency range from the waveguide component to the first circuitry with substantially low loss and substantially high impedance matching.

Producing a substantially low impedance at the first frequency range in a first transmission line may comprise forming at least one stub coupled to the first transmission line. Producing a substantially low impedance at the second frequency range in a second transmission line may comprise forming at least one embedded spurline in the second transmission line.

In accordance with still another aspect of the present invention, a method for receiving radio frequency signals may comprise: receiving signals having a plurality of frequency ranges; defining a plurality of generally parallel planes; forming a plurality of transmission lines, one of the plurality of transmission lines being formed in each of the plurality of generally parallel planes; forming circuitry for each of the plurality of transmission lines to define substantially low impedances for all of the plurality of frequency ranges except for a frequency range to be carried by the corresponding transmission line; and coupling the signals to the plurality of transmission lines so that signals with the plurality of frequency ranges are received and distributed with substantially decreased reflection and substantially high impedance matching by the plurality of transmission lines.

BRIEF DESCRIPTION OF THE SEVERAL VIEWS OF THE DRAWINGS

The following detailed description of various embodiments of the present invention can be best understood when read in conjunction with the following drawings, where like structure is indicated with like reference numerals, and in which:

FIGS. 1A, 1B and 1C show cross-sections of a simple rectangular waveguide, a single-ridge waveguide, and a double-ridge waveguide, respectively;

FIG. 2 is a cutaway perspective view of the lower half of a double-ridge horn antenna;

FIG. 3 is a graph of the gain of a simple horn antenna with a rectangular cross-section, such as the antenna of FIG. 1A, as a function of frequency;

FIG. 4 is a graph of the gain of a double-ridge horn antenna, such as the antenna of FIG. 1C or FIG. 2, sized comparably to the simple horn antenna whose gain is shown in FIG. 3;

FIG. 5 shows a cross-section of a multilayer printed circuit board which can be used for receiving radio frequency signals in accordance with the teachings of the present application;

FIG. 6 is a cutaway perspective view of the lower half of a waveguide component which can be used as an antenna for receiving signals in accordance with the teachings of the present application;

DETAILED DESCRIPTION OF THE INVENTION

Figure 7:
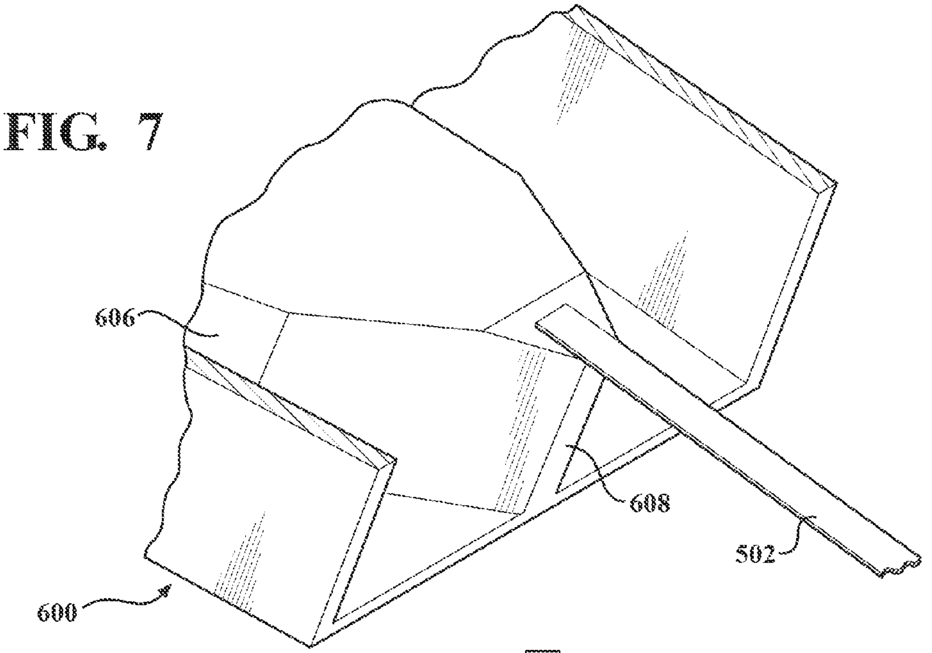
FIG. 7 illustrates on a magnified scale the transition between the antenna of FIG. 6 and microstrip formed on the lower side of the multilayer printed circuit board of FIG. 5.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention. The methods and apparatus for receiving radio frequency signals of the present application are described with reference to microstrip technology for which it is initially being used. However, embodiments utilizing other forms of transmission mediums are contemplated.

Several arrangements have been used in the past for transferring electromagnetic energy from a waveguide or antenna, such as a ridged horn antenna to another medium, such as microstrip. In order to transition smoothly to the outside world, the ridge of a ridged horn antenna has to taper in width as the antenna tapers and also to taper in height so that the ridge vanishes before reaching the front of the horn antenna. An example of such a rib structure is shown FIG. 2 in a cutaway perspective view of the lower half of a double-ridge horn antenna 200. The incoming energy impinges on the rectangular cross-section 202 of the front of the antenna 200, shown to the left in FIG. 2, and, due to symmetry of a plane wave, sets up primarily the fundamental mode of the rectangular waveguide. The energy then propagates to the back 204 of the antenna 200, shown to the right in FIG. 2, as the cross-section of the antenna 200 tapers down.

At a point, 206 in FIG. 2, a ridge begins to grow and the mode smoothly transforms to the fundamental mode of a ridged waveguide as the tapering continues and the ridge continues to grow until the cross-section at the back 204 of the antenna 200 is reached, shown to the right in FIG. 2. At the back 204 of the antenna 200, the dimensions of the rectangular portion of the antenna 200 would be too small to allow the lowest frequency through, but for a ridged waveguide or antenna, the lowest frequency $f_c$ is not given by Equation 1 above but is lower than that value. In addition, the minimum frequency of undesirable higher modes are more than $2f_c$ and therefore a ridged antenna can handle a range of frequencies exceeding an octave.

FIG. 3 shows the gain of a horn antenna with a rectangular cross-section, such as the antenna of FIG. 1A, as a function of frequency, and FIG. 4 shows the gain of a comparably sized ridged horn antenna, such as the antenna of FIG. 2 having a cross-section as shown in FIG. 1C.

A comparison of FIGS. 3 and 4 shows that without the ridges, the gain is generally lower than that for the antenna with the ridges, and that the gain at higher frequencies does not continue to rise as it does with the ridges, due to the presence of higher-order modes. In addition, the gain does not go above 0 dBi until the frequency exceeds approximately 14 GHz without the ridges, whereas the gain goes above 0 dBi at just under 10 GHz with the ridges.

The design of ridged waveguide antennas is well known in the art, forms no part of the present invention and so will be described herein only as needed for an understanding of the methods and apparatus for receiving radio frequency signals of the present application. The present application is directed to the transition from a ridged waveguide antenna to another transmission media illustrated and described as a microstrip line on a printed circuit board herein. The transition from single-ridge waveguide antennas to a microstrip line is known to require careful selection of ridge design and matching the physical dimensions of the ridge width to the width of the microstrip while allowing the ground plane of the circuit board to smoothly join the side of the antenna that has no ridge. The transition from double-ridge waveguide antennas to microstrip lines on circuit boards is known to involve tapering the top ridge to match the microstrip, as is done with single-ridge antennas, and at the same time, gradually widening the bottom ridge until it effectively becomes the ground plane and smoothly joins the ground plane of the printed circuit board.

The known transitional arrangements have disadvantages including losses, broadband tuning difficulties, and printed circuit board space required to make the transitions. With regard to losses, systems used in police radar detector designs include, for example, the following ranges of frequencies: 10.5 to 10.55 GHz (X band); 13.35 to 13.55 GHz (Ku band); 22 to 24.3 GHz (K band); and 32 to 36 GHz (Ka band). Typically for these frequency bands, the incoming signals must be separated into at least two bands or sub-bands, for example a high band including the pair of high bands (K and Ka bands) and a low band including the pair of low bands (X and Ku bands), or more, and commonly used diplexing circuits that perform the signal separation insert losses that cannot be avoided.

With regard to broadband tuning problems, it is difficult to design the transition from a ridged waveguide antenna to microstrip such that it does not favor one part of the frequency spectrum and cause losses at other parts of the frequency spectrum. For a broadband system, it is desirable to have minimal loss for all the frequencies of interest, such as those in the X, Ku, K and Ka bands noted above, which is very difficult to accomplish.

With regard to space requirements, the circuitry that separates a band of frequencies on a microstrip circuit into more than one band or sub-band, for example taking a band or sub-band of high frequencies to one circuit and a band or sub-band of low frequencies to another circuit, occupies space since all the circuitry has to be on the same side of the same circuit board. If space saving is desired, a multilayer board may be incorporated such that one or more bands or sub-bands are directed through to other layers of the circuit. However, for systems requiring relatively high frequencies, such as those above 20 GHz, losses due to travel between layers are considerable such that the circuit must remain on one layer until a frequency conversion has taken place, thereby increasing the area of that layer.

In accordance with the broadest aspects of the teachings of the present application, radio frequency signals having a plurality of frequency ranges are received and coupled to a plurality of transmission lines, one of the plurality of transmission lines being formed in each of a plurality of generally parallel planes. Circuitry is formed for each of the plurality of transmission lines to define substantially low impedances to suppress all of the plurality of frequency ranges except for a frequency range to be carried by the corresponding transmission line. Signals are coupled to the plurality of transmission lines so that signals with the plurality of frequency ranges are received and distributed with substantially decreased reflection and substantially high impedance matching with the plurality of transmission lines.

In accordance with an illustrative embodiment of the present application, a radio frequency signal receiving structure comprises a waveguide component serving as an antenna for receiving signals having at least a first frequency range and a second frequency range. Referring to FIG. 5, a first transmission line 500 is formed in a first plane P1 for carrying signals within the second frequency range and a second transmission line 502 is formed in a second plane P2 for carrying signals within the first frequency range with the first plane P1 being parallel to the second plane P2. The first and second transmission lines 500, 502 are formed on opposite sides of a multilayer printed circuit board 504 shown in cross-section in FIG. 5. The multilayer printed circuit board 504 in the illustrated embodiment includes two copper-clad dielectric boards 506, 508 joined together by a layer of adhesive 510. As illustrated, the circuit boards 506, 508 include ground planes 512, 514. Other embodiments may include third, fourth, fifth or more layers of varying thicknesses and materials, with or without ground planes as the application dictates. Some layers may include circuitry for performing operations in addition and not related to the reception of radio frequency signals. For example, circuitry internal to the circuit board 504 can be used for processing radio frequency signals after they are received in accordance with signal processing required for operation of police radar detectors or other applications.

The waveguide component of the illustrated embodiment comprises a double-ridge waveguide horn antenna 600, the lower half of which is shown in FIG. 6, the upper half of the horn antenna 600 being substantially a mirror image of the lower half. As discussed with reference to FIG. 2, the horn antenna 600 tapers down from the front 602 towards the back 604. Near the back 604 of the horn antenna 600, its ridges 606 (only the bottom ridge is shown) converge more rapidly until they substantially match the width of microstrip lines that form the first and second transmission lines 500, 502 of the multilayer printed circuit board 504 with which it makes contact around an edge 608 of the bottom one of the ridges 606 as best shown in FIG. 7. The ridges 606 (only the bottom ridge is shown in FIGS. 6 and 7) also converge toward one another so that the spacing between the ridges 606 substantially matches the thickness of the multilayer printed circuit board 504. In this way, the bottom one of the ridges 606 and the top one of the ridges 606 (not shown) of the horn antenna 600 contact microstrip lines that form the second and first transmission lines 502, 500, respectively.

FIG. 7 illustrates on a magnified scale the transition between the antenna 600 and microstrip that forms the second transmission line 502. The microstrip lines, to which the design features described below are connected or formed into, protrude into and touch the ends of the adaptive sections of the antenna 600, the ridges 606 as illustrated. Not shown in FIG. 7 are the dielectric, the ground plane(s), adhesive, and other circuitry as shown in FIG. 5 and as will be described below, respectively.

For the above disclosed structure, the fundamental mode traveling along the dual-ridge waveguide antenna 600 is initially symmetric with regard to the ridges 606. The two circuit boards 506, 508, each with its own ground plane, are secured to one another, ground plane to ground plane, by the layer of adhesive 510 between the ground planes as shown in FIG. 5 to form the multilayer printed circuit board 504. The microstrip lines that form the first and second transmission lines 500, 502, are printed together with other microstrip circuitry on outside surfaces of the multilayer printed circuit board 504 and these outside surfaces may be referred to as the "component sides" of the circuit boards 506, 508. Alternately, the two ground planes may contact each other, other dielectrics can be used to separate the ground planes, a third printed circuit board including circuitry possibly unrelated to the circuitry on the component sides of the two circuit boards 506, 508, or multiple such circuit boards may be interposed between the circuit boards 506, 508 dependent upon given applications.

If the first and second transmission lines 500, 502 are microstrip lines, typically of 50 ohms impedance, without further associated circuitry, then by symmetry half of the received energy would transfer to each symmetric side, less the losses resulting from the transition. However, the inventors of the present application recognized that if a thicker board or smaller-gap ridge is used, a single board with its ground plane directly contacting one ridge and a microstrip line directly contacting the other ridge results in a relatively low-loss transfer of all of the incoming energy to the microstrip line.

In accordance with the teachings of the present application, an electrical short or very low impedance is imposed on one side of the two-sided arrangement, the first transmission line 500, for example, at the frequency or frequency range which the second transmission line 502 is required to transport. Thus, incoming energy at that frequency or frequency range sees an electrical "ground plane" rather than a microstrip circuit on one side, and a microstrip circuit tuned to have an impedance reasonably equal to 50 ohms (if that is the system-preferred impedance) on the other side. Thus, a relatively low-loss transfer of all of the incoming energy at the frequency or frequency range which the second transmission line 502 is required to transport is made to the microstrip line that forms the second transmission line 502.

Similarly, an electrical short or very low impedance is imposed on the other side of the two-sided arrangement, the second transmission line 502, for example, at the frequency or frequency range which the first transmission line 500 is required to transport. Thus, incoming energy at that frequency or frequency range sees an electrical "ground plane" rather than a microstrip circuit on one side, and a circuit tuned to have an impedance reasonably equal to 50 ohms (if that is the system-preferred impedance) on the other side. Thus, a relatively low-loss transfer of all of the incoming energy at the frequency or frequency range which the first transmission line 500 is required to transport is made to the microstrip line that forms the first transmission line 500. In this way in accordance with the teachings of the present application, separate tuning circuits are formed on the component sides of the circuit boards 506, 508 so that signals having at least a first frequency range are directed to the second transmission line 502 and signals having at least a second frequency range are directed to the first transmission line 500.

As an example, 10.5 to 10.55 GHz (X band), 13.35 to 13.55 GHz (Ku band), 22 to 24.3 GHz (K band), and 32 to 36 GHz (Ka band) would be the desired frequencies of received energy for a police radar detector. According to the teachings of the present application, a first portion of a signal splitting component or first circuitry would be connected to the first transmission line 500 of the back-to-back printed circuit boards 506, 508 and would be tuned to be a very low impedance at the frequency ranges of 10.5 to 10.55 GHz and 13.35 to 13.55 GHz, while a second portion of a signal splitting component or second circuitry would be connected to the second transmission line 502 and would be tuned to be a very low impedance at 22 to 24.3 GHz and 32 to 36 GHz. The signal splitting component comprising first and second circuitry located on opposite sides of the multilayer printed circuit board 504 thus results in substantially all the energy in the frequency ranges 10.5 to 10.55 GHz and 13.35 to 13.55 GHz going to the second transmission line 502, and substantially all the energy in the frequency ranges 22 to 24.3 GHz and 32 to 36 GHz going to the first transmission line 500.

Figure 8:
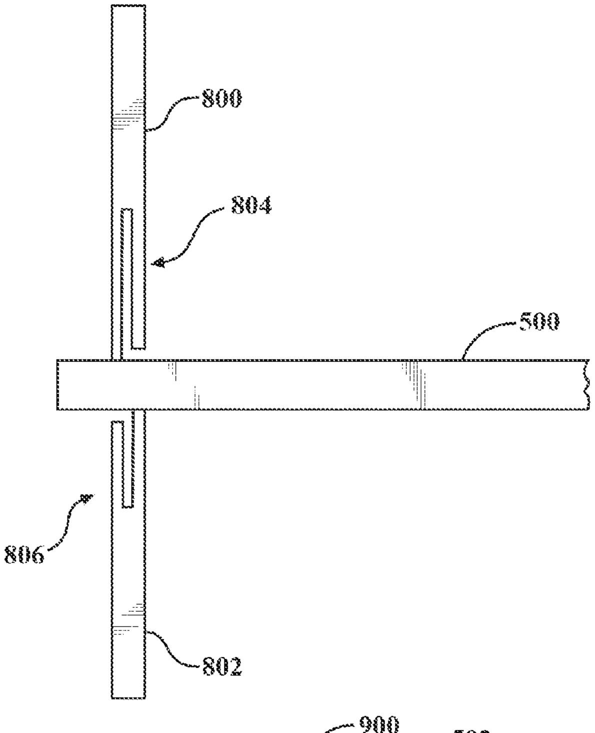
FIG. 8 illustrates a microstrip embodiment of first circuitry connected to a first transmission line which can be used in accordance with the teachings of the present application for diverting substantially all energy in the frequency ranges of 10.5 to 10.55 GHz and 13.35 to 13.55 GHz to a second transmission line.

With reference to FIG. 8, the first circuitry is illustrated as a pair of stubs 800, 802 connected to the first transmission line 500 with the stubs 800, 802 being tuned or sized to present a low impedance, substantially a short circuit, at frequencies in the range 10.5 to 10.55 GHz and 13.35 to 13.55 GHz, respectively. In the embodiment illustrated in FIG. 8, a pair of spurlines 804, 806 have been formed into the pair of stubs 800, 802, respectively, to ensure that a very high impedance, substantially an open circuit, is presented at the base of each stub 800, 802 for frequencies in the range of 22 to 24.3 GHz and 32 to 36 GHz, which are the frequencies that are to flow through the transmission line 500 from left to right as shown in FIG. 8. It is contemplated that the first circuitry could take a variety of forms and, when stubs are used as illustrated, one or more than two stubs could be used for the first circuitry.

Operation of stubs having spurlines formed therein is fully described in a related U.S. patent application Ser. No. 12/983,351 entitled MIRCROWAVE FILTER that is being filed on the same day as the present application, is assigned to the assignee of the present application and is incorporated by reference herein in its entirety.

Figure 9:
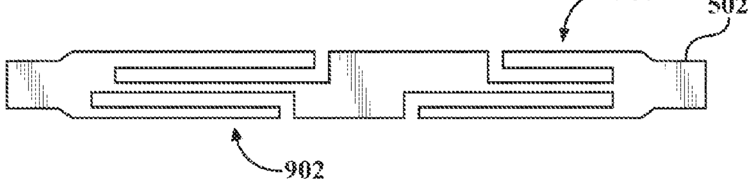
FIG. 9 illustrates a microstrip embodiment of second circuitry connected to a second transmission line which can be used in accordance with the teachings of the present application for diverting substantially all energy in the frequency ranges of 22 to 24.3 GHz and 32 to 36 GHz to a first transmission line.

With reference to FIG. 9, the second circuitry is illustrated as two pairs of spurlines 900, 902 which are formed in the second transmission line 502. The pairs of spurlines 900, 902 are tuned or sized to present a low impedance, substantially a short circuit, at frequencies in the ranges of 22 to 24.3 GHz and 32 to 36 GHz, respectively, at the point of attachment to the antenna on the left of FIG. 10. Frequencies below these ranges travel unimpeded through the second transmission line 502. The pairs of spurlines 900, 902 advantageously take up very little space on the component side of the circuit board 508. It is contemplated that the second circuitry could take a variety of forms and, when spurlines are used as illustrated, additional spurlines could be used for the second circuitry. Also, stubs could be used for the second circuitry. However, if stubs were used, there would be no need to form spurlines in the stubs forming the second circuitry since there is no need to pass any odd harmonics of frequencies in the ranges of 22 to 24.3 GHz and 32 to 36 GHz.

In accordance with the teachings of the present application, the first circuitry, such as the stubs 800, 802 with embedded spurlines 804, 806 shown in FIG. 8, can now be positioned on one side of the multilayer printed circuit board 504 and the second circuitry, such as the spurlines 900, 902 formed in the transmission line 502 shown in FIG. 9 on the other side of the multilayer printed circuit board 504.

Figure 10:
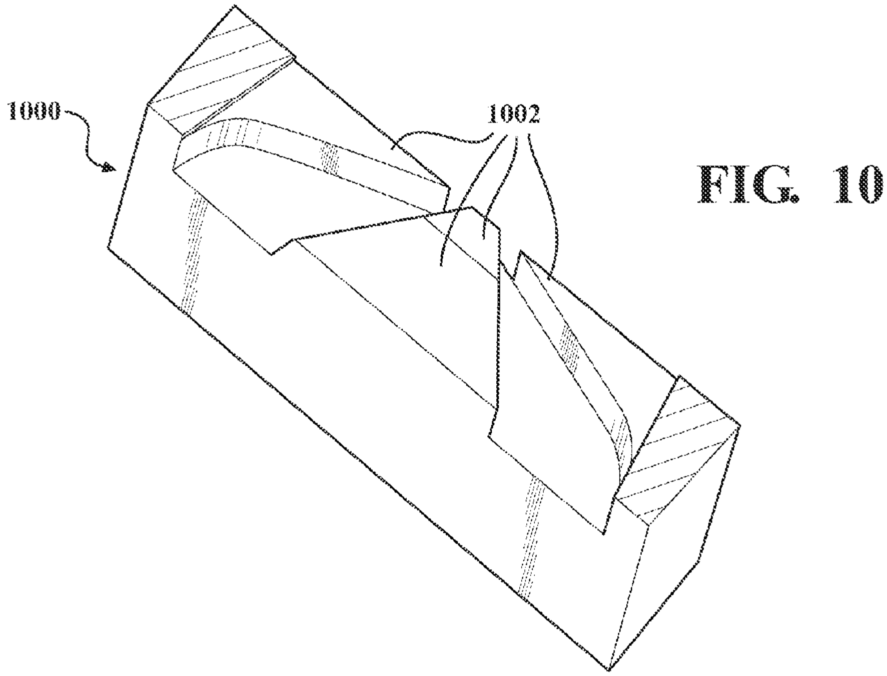
FIG. 10 is a cutaway perspective view of the lower half of a transition component formed by a short section of an antenna and including a variety of features or tuned transitions that can be used in accordance with the teachings of the present application to transition from the antenna to microstrip circuitry.

FIG. 10 shows an exemplary embodiment of a transition component formed by a short section of an antenna 1000, such as a back portion of the double-ridge waveguide horn antenna 600. The transition component serves to transition the tapering waveguide of the horn antenna itself to the asymmetric back-to-back printed circuit boards, such as the circuit boards 506, 508. The short section of an antenna 1000 is illustrated as including a variety of features or tuned transitions 1002 having a variety of dimensions. The exact dimensions of the features shown in FIG. 10, as well as whether some features are incorporated into the transitional section of the antenna or not, depend on the frequency of interest to be passed, the design of the corresponding tuning circuitry on the printed circuit boards that are connected to this structure, the impedance at the back of the antenna at the frequency or frequencies of interest, which may or may not be near the cutoff frequency of the waveguide $f_c$ defined previously, as well as other considerations as will be apparent to those skilled in the art of receiving radio frequency signals.

Figure 11:
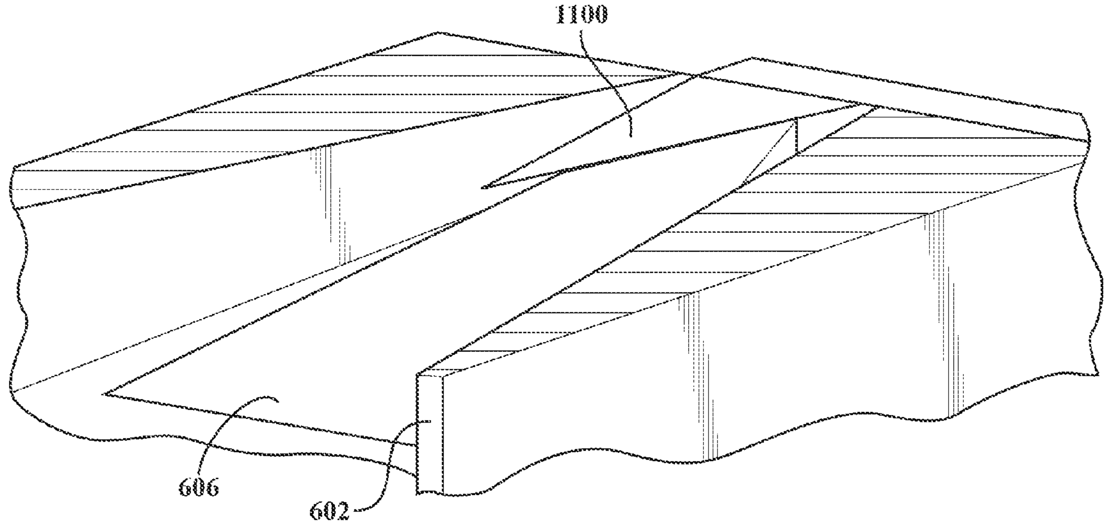
FIG. 11 illustrates a dielectric structure that can be used to enhance impedance matching in accordance with the teachings of the present application.

A dielectric structure 1100 shown in FIG. 11 can also be added to enhance the impedance matching between the antenna, such as the double-ridge waveguide horn antenna 600, and the circuit boards 506, 508. The dielectric structure 1100 is illustrated as a triangular-shaped tongue that can be a continuation of a printed circuit board assembly, such as the multilayer printed circuit board 504, in which case it would consist of the dielectric of the circuit boards 506, 508 and the layer of adhesive 510 between them, but not the ground planes or metallic conductors that form part of the multilayer printed circuit board 504. It could also be a single dielectric of appropriate thickness or any other appropriate combination of dielectrics. The shape of such an impedance matching device can vary, with a triangle being the most straightforward, and depends on the antenna taper, as well as the taper of the ridges as will be apparent to those skilled in the art of receiving radio frequency signals.

Having thus described the invention of the present application in detail and by reference to preferred embodiments thereof, it will be apparent that modifications and variations are possible without departing from the scope of the invention defined in the appended claims.

What is claimed is:

1. A radio frequency signal receiving structure, comprising:

a waveguide component for receiving signals having at least a first frequency range and a second frequency range;

a first transmission line for carrying signals within said second frequency range in a first plane;

a second transmission line for carrying signals within said first frequency range in a second plane parallel to said first plane;

a signal splitting component comprising:

first circuitry associated with said first transmission line for producing a substantially low impedance at said first frequency range; and second circuitry associated with said second transmission line for producing a substantially low impedance at said second frequency range;

wherein said first circuitry is in said first plane and said second circuitry is in said second plane; and a transition component for transferring said signals between said waveguide component and said first and second transmission lines;

wherein said signal receiving structure is configured to transfer signals within said first frequency range through said second transmission line with substantially low loss and substantially high impedance matching, and to transfer signals within said second frequency range through said first transmission line with substantially low loss and substantially high impedance matching.

2. The radio frequency signal receiving structure according to claim 1, wherein said first circuitry comprises at least one stub connected to said first transmission line configured to attenuate signals within said first frequency range and pass signals within said second frequency range.

3. The radio frequency signal receiving structure according to claim 2, wherein said at least one stub has an embedded spurline.

4. The radio frequency signal receiving structure according to claim 2, wherein said first circuitry comprises at least two stubs connected to said first transmission line.

5. The radio frequency signal receiving structure according to claim 1, wherein said second circuitry comprises at least one spurline formed in said second transmission line configured to substantially attenuate signals at said second frequency range while substantially passing signals at said first frequency range.

6. The radio frequency signal receiving structure according to claim 1 wherein said second circuitry comprises a plurality of spurlines formed in said second transmission line configured to substantially attenuate signals at said second frequency range while substantially passing signals at said first frequency range.

7. The radio frequency signal receiving structure according to claim 1, wherein said first frequency range comprises 10.5 GHz to 10.55 GHz and 13.35 GHz to 13.55 GHz; and said second frequency range comprises 22 GHz to 24 GHz and 32 GHz to 36 GHz.

8. The radio frequency signal receiving structure according to claim 1, wherein said waveguide component defines a cavity extending from a first opening to a second opening, said first opening being larger than said second opening.

9. The radio frequency signal receiving structure according to claim 8, wherein said cavity is configured to have one of the following cross-sections: rectangular, elliptical and curvilinear.

10. The radio frequency signal receiving structure according to claim 8, wherein said waveguide component comprises:

a first ridge disposed inside said cavity; and a second ridge disposed inside said cavity opposite to said first ridge.

11. The radio frequency signal receiving structure according to claim 10, wherein said first and second ridges are independently configured to have substantially the same cross-sections towards said first opening of said cavity.

12. The radio frequency signal receiving structure according to claim 10, wherein said first and second ridges are configured to have rectangular cross-sections.

13. The radio frequency signal receiving structure according to claim 10, wherein said transition component comprises:

a portion of said first ridge coupled to said first transmission line; and a portion of said second ridge coupled to said second transmission line.

14. The radio frequency signal receiving structure according to claim 1, wherein said signal receiving structure further comprises at least one ground plane associated with said first and second transmission lines.

15. The radio frequency signal receiving structure according to claim 14, wherein said at least one ground plane comprises a first ground plane associated with said first transmission line and a second ground plane associated with said second transmission line, wherein said first ground plane is separated from said second ground plane by dielectric material.

16. The radio frequency signal receiving structure according to claim 15, wherein said first and second ground planes are connected to one another through said dielectric material.

17. The radio frequency signal receiving structure according to claim 15, wherein said dielectric material extends into said waveguide component.

18. The radio frequency signal receiving structure according to claim 15, wherein said dielectric material comprises two or more layers of dielectric material secured to one another with adhesive.

19. The radio frequency signal receiving structure according to claim 1, further comprising third circuitry located between said first and second planes.

20. The radio frequency signal receiving structure according to claim 19, wherein said third circuitry is separated from said first and second planes by at least one dielectric layer.

21. The radio frequency signal receiving structure according to claim 20, wherein said waveguide component comprises a double-ridge horn antenna.

22. A method for receiving radio frequency signals, comprising:

receiving signals having at least a first frequency range and a second frequency range using a waveguide component;

producing a substantially low impedance at said first frequency range in a first transmission line in a first plane;

producing a substantially low impedance at said second frequency range in a second transmission line in a second plane, said first and second planes being substantially parallel to one another; and transferring signals in said first frequency range from said waveguide component to second circuitry with substantially low loss and substantially high impedance matching; and transferring signals in said second frequency range from said waveguide component to first circuitry with substantially low loss and substantially high impedance matching.

23. The method for receiving radio frequency signals according to claim 22, wherein producing a substantially low impedance at said first frequency range in a first transmission line comprises forming at least one stub coupled to said first transmission line.

24. The method for receiving radio frequency signals according to claim 23, wherein producing a substantially low impedance at said second frequency range in a second transmission line comprises forming at least one embedded spurline in said second transmission line.

25. A method for receiving radio frequency signals, comprising:

receiving signals having a plurality of frequency ranges;

defining a plurality of generally parallel planes;

forming a plurality of transmission lines, one of said plurality of transmission lines being formed in each of said plurality of generally parallel planes;

forming circuitry for each of said plurality of transmission lines to define substantially low impedances for all of said plurality of frequency ranges except for a frequency range to be carried by the corresponding transmission line; and coupling said signals to said plurality of transmission lines so that signals with said plurality of frequency ranges are received and distributed with substantially decreased reflection and substantially high impedance matching by said plurality of transmission lines.

* * * * *